United States Patent [19]
Bryson

BEST AVAILABLE COPY

[11] 3,927,137
[45] Dec. 16, 1975

[54] METHOD OF PREPARING NONCONJUGATED DIOLEFINS

[75] Inventor: Jay G. Bryson, Tallmadge, Ohio

[73] Assignee: The Goodyear Tire & Rubber Company, Akron, Ohio

[22] Filed: Mar. 18, 1974

[21] Appl. No.: 452,242

[52] U.S. Cl. .................................. 260/680 B
[51] Int. Cl.² ...................... C07C 3/21; C07C 11/12
[58] Field of Search ............ 260/680 B; 252/431 N

[56] References Cited
UNITED STATES PATENTS

| | | | |
|---|---|---|---|
| 3,441,629 | 4/1969 | Schneider | 260/680 B |
| 3,539,652 | 11/1970 | Schneider | 260/680 B |
| 3,565,875 | 2/1971 | Bozik et al. | 252/431 N |
| 3,669,949 | 6/1972 | Yoo | 260/680 B |
| 3,677,968 | 7/1972 | Bozik et al. | 252/431 N |
| 3,836,602 | 9/1974 | Wideman | 260/673 |

*Primary Examiner*—Paul M. Coughlan, Jr.
*Attorney, Agent, or Firm*—F. W. Brunner; J. Y. Clowney

[57] ABSTRACT

Method of codimerizing conjugated diolefins and lower α-olefins to nonconjugated diolefins. The catalyst system employed is a mixture of (1) an iron compound, (2) a reducing agent which is an organoaluminum compound, and (3) a ligand described as a bidentate nitrogen compound.

8 Claims, No Drawings

METHOD OF PREPARING NONCONJUGATED DIOLEFINS

This invention relates to the codimerization of hydrocarbons. More specifically, it relates to an improved method for the production of nonconjugated diolefins from the codimerization of conjugated diolefins and lower α-olefins.

It is known that lower α-olefins and conjugated diolefins can be catalytically converted into codimers. These codimers are acyclic in nature and can take several forms. Certain nonconjugated diolefins such as 1,4-hexadienes are useful as comonomers in the preparation of terpolymers, and being one of the products that can result from the codimerization of certain conjugated diolefins and lower α-olefins, it is desirable to obtain as high a yield to the 1,4-hexadiene as possible.

It is known that certain iron-containing catalysts are useful in the codimerization of lower α-olefins and conjugated diolefins. These prior art processes which have been reported, for instance, use a catalyst system comprising a mixture of (1) an iron salt or complex, (2) a reducing agent, such as triethylaluminum, and (3) a ligand or other compound which has been determined to promote the desired product.

However, it has been observed that these prior art processes, while a substantial amount of the starting materials are converted to codimer, the selectivity to the desired product, namely the nonconjugated diolefins, is not very good. For instance, in prior art processes for codimerization of lower α-olefins and conjugated diolefins, the yield of the desired product is usually less than 60 percent.

It has been discovered that when certain changes in the catalyst ligand are employed, there is a considerable improvement in the rate of conversion of the conjugated diolefin to the codimer and some improvement in the selectivity to the nonconjugated diolefin.

Accordingly, the invention is a method for the conversion of conjugated diolefins selected from the group consisting of butadiene and 2,3-dimethyl-1,3-butadiene with lower α-olefins to nonconjugated diolefins. Thus, the invention comprises contacting said conjugated diolefin and lower α-olefins with a ternary catalyst system comprising (1) an iron compound selected from the group consisting of iron salts and iron complexes, (2) an organoaluminum compound wherein the improvement comprises adding (3) a ligand which is characterized as a bidentate nitrogen compound in which the moiety

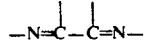

occurs.

The olefin hydrocarbons which can be utilized in this invention are ethylene, propylene and 1-butene. The preferred olefin is ethylene.

A more preferred group of monomers for codimerization would be 2,3-dimethyl-1,3-butadiene codimerized with ethylene.

The second component of the catalyst system are reducing agents consisting of at least one member of the group consisting of organoaluminum compounds. Representative but not all inclusive of suitable organoaluminum compounds are triethyl aluminum, triisobutyl aluminum, lithium tetraethyl-aluminate, diethyl aluminum ethoxide and the like. Trialkylaluminums such as triethylaluminum are the preferred organoaluminum compounds for use with this invention.

The iron compounds useful in the practice of this invention are preferably the iron salts of carboxylic acids containing from 2 to 40 carbon atoms, or the iron complexes of such agents as 1,3-diketones. Representative but by no means exhaustive of the iron salts of such carboxylic acids include iron acetate, iron propionate, iron isobutyrate, iron n-butyrate, iron trimethyl acetate, iron n-pentanoate, iron 3-methyl butyrate, iron octanoate and various other iron salts of other carboxylic acids containing from 2 to 40 carbon atoms.

Representative of the iron complexes are iron 2,3-pentanedionate (commonly called iron acetylacetonate), iron 3-methyl-2,4-pentanedionate, iron 1-ethoxy-1,3-butanedionate, iron 1,3-diethoxy-1,3-propanedionate, iron 1,3-diphenyl-1,3-propanedionate, iron 1-cyclohexyl-1,3-butanedionate and other iron complexes of 1,3-diketones.

Also useful in this invention as an iron salt are the iron salts of alkyl substituted naphthenic carboxylic acids and the iron soaps or the soap called iron drier compounds. The iron salts of individual naphthenic acids are rarely found because the naphthenic acids are usually complex mixtures with their common derivatives being cyclopentane, cyclohexane, cycloheptane and the higher molecular weight alkyl substituted analogs.

The cyclic soaps useful in this invention are usually iron in combination with fatty acids such as stearic resin (resinates) and tall oil (tallate).

Of all the compounds useful as the iron salt or iron complex in this invention, iron octanoate and iron acetylacetonate are preferred.

The third component of the ternary catalyst system of this invention consists of a nitrogen bidentate ligand. Ligant is defined as an ion or molecule bound to and considered bonded to a metal atom or ion. Bidentate means having two positions through which covalent or coordinate bonds with the metal may be formed. The ligands useful in this invention are certain bidentate nitrogen compounds. These ligands are believed to direct the reaction toward codimerization wherein the codimer goes mainly to nonconjugated diolefins. The class of ligands which is employed in the present invention are those ligands responding to the formulas a. the compounds of the formula

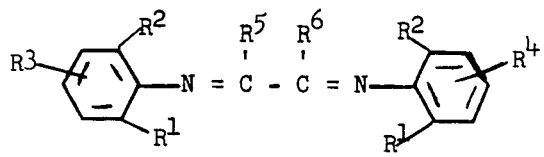

where $R^1$ and $R^2$ can be at least one hydrogen or methyl, $R^3$ and $R^4$ can be at least one hydrogen, alkyl, alkoxy, and/or dialkylamino group (where the alkyl or alkoxy contain from 1 to 4 carbons), and where $R^5$ and $R^6$ can be hydrogen or methyl;

b. the compounds of the formula

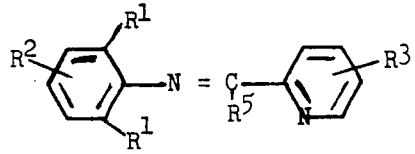

where $R^1$ can be hydrogen and/or methyl, $R^2$ and $R^3$ can be at least one hydrogen, alkyl, alkoxy, and/or dialkylamino group (where the alkyl or alkoxy contain from 1 to 4 carbons) and where $R^5$ can be hydrogen or methyl.

Representative of the compounds which can be utilized in this invention which correspond to the above formulas are glyoxal-bis-(2,6-dimethylanil), biacetyl-bis-(2,6-dimethylanil), glyoxal-bis-(4-methylanil), biacetyl-bis-(4-methylanil), glyoxal-bis-(2-methylanil), biacetyl-bis-(2-methylanil), glyoxal-bisanil, biacetyl-bisanil, glyoxal-bis-(4-ethoxyanil), biacetyl-bis-(4-ethoxyanil), glyoxal-bis-(3-methoxyanil), biacetyl-bis-(3-methoxyanil), glyoxal-bis-(4-dimethylaminoanil), glyoxal-bis-(2,6-dimethyl-4-ethoxyanil), biacetyl-bis-(2,6-dimethyl-4-ethoxyanil), 2-pyridine carboxaldehyde anil, 2-pyridine carboxaldehyde-2-methylanil, 2-pyridine carboxaldehyde-4-methylanil, 2-pyridine carboxaldehyde-2-isopropylanil, 2-pyridine carboxaldehyde-2-ethyl anil, 2-pyridine carboxaldehyde-4-methoxyanil, 2-pyridine carboxaldehyde-4-dimethylaminoanil, 2-pyridine carboxaldehyde-2,6-dimethyl-4-methoxyanil, 2-pyridine carboxaldehyde-2,6-dimethyl-4-dimethylaminoanil, 2-acetylpyridine-2-methylanil, 2-acetylpyridine-4-methylanil, 2-acetylpyridine-2-isopropylanil, 2-acetylpyridine-4-methoxyanil, 2-acetylpyridine-4-dimethylaminoanil, 2-acetylpyridine-2,6-diethyl-4-diethylaminoanil.

The components of the catalyst system employed in this invention should be as pure as can be economically obtained and the catalyst components as well as the codimerization reaction system should be essentially free of moisture and other deleterious substances. The iron compound and the ligand should be mixed together before the reducing agent is added.

In the particular catalyst system of this invention cyclopentadiene is significantly detrimental to the catalyst activity if it is above 200 parts per million. Other hydrocarbons such as alkanes, olefins and alkynes are not detrimental to this system.

The mole ratios of the reactants can vary over a considerable range. For instance, the mole ratio of the iron compound to the mole ratio of the conjugated diolefin can range from about 10/1 to about $1/10^5$; however, a more preferable range is from about 1/1000 to about $1/10^4$.

The mole ratio of the ligand to the iron compound may vary from about 0.7/1 to about 5/1. A more preferred range would be from about 1/1 to about 3/1.

The mole ratio of the reducing compound to the iron compound may range from about 1/1 to about 12/1. A more preferred range is from about 4/1 to about 9/1.

The temperature at which the codimerization process of this invention is conducted may vary from a low temperature of about 60° up to 130°C. However, it has been found that the best results have been obtained when the reaction is run from about 80° to about 100°C. The reaction may be run as a batch or continuous process. The diolefin may be added to the reaction mixture all at once, or gradually.

It is usually desirable, but not necessary, to conduct the codimerization in the presence of an inert solvent or diluent. The term "inert" is meant to denote that the solvent has no adverse effect on the reaction. Representative of such solvents are pentane, hexane, heptane, octane, cyclohexane, mixtures of petroleums boiling between 60°C. and 200°C., ethylbenzene, xylene, 1,5-cyclooctadiene, tetramethyl-1,5-cyclooctadiene, benzene, toluene, or mixtures thereof. When diethyl aluminum ethoxide is used as reductant, diethyl ether or anisole may be used as solvent.

The pressures which are employed in this process can range from ambient pressure created by the monomer/solvent system at operating temperature up to 5000 psig. Preferably, however, it is practical to employ pressures from about 200 to 1000 psig with reactions involving ethylene and 50–600 psig reactions involving propylene or 1-butene.

Further practice of this invention is illustrated by reference to the following examples which are intended to be illustrative and in no manner limiting.

EXAMPLE I

To a 30 milliliter (ml) reactor under an ethylene atmosphere was added 0.1 millimoles of iron octoate, 52.8 milligrams of glyoxal bis-2,6-dimethylanil, 30 millimoles of butadiene in 15 ml. of toluene, 0.2 ml. of 2 molar tri-ethylaluminum in toluene, then treated with 60 millimoles of ethylene, and shaken at 100° under autogeneous pressure for ten minutes. The reaction mixture was cooled, then quenched with 1 ml. of isopropanol, and analyzed gas chromatographically. Butadiene conversion was 99.7 percent. Selectivity to 1,4-hexadiene was 85 percent. Selectivity to 2,4-hexadiene was 1.5 percent. Selectivity to butadiene dimers was 3 percent. Higher boiling materials formed in 4 percent selectivity were observed gas chromatographically.

EXAMPLE II

To a 30 ml. reactor under ethylene atmosphere was added iron octanoate (0.05 millimoles), 17.5 mg. of biacetylbisanil in 3.1 ml. of toluene, 5.64 ml. of 2,3-dimethyl-1,3-butadiene, 3.1 ml. of toluene, 0.2 millimoles of triethyl aluminum in 3.2 ml. of toluene, then treated with 70 millimoles of ethylene, and shaken at 90°C. for 80 minutes. Dimethylbutadiene conversion was 82 percent. Selectivity to 4,5-dimethyl-1,4-hexadiene was 93 percent.

EXAMPLE III

The procedure used was similar to Example 2 except that the ligand was not used. Dimethylbutadiene conversion was 18 percent. Selectivity to 4,5-dimethyl-1,4-hexadiene was 80 percent.

While certain representative embodiments and details have been shown for the purpose of illustrating the invention, it will be apparent to those skilled in this art that various changes and modifications may be made therein without departing from the spirit or scope of the invention.

What is claimed is:

1. A method of codimerizing conjugated diolefin selected from the group consisting of butadiene and 2,3-dimethyl-1,3-butadiene with lower α-olefins to nonconjugated diolefins which comprises contacting said diolefins and lower α-olefins with a ternary catalyst system consisting essentially of (1) an iron compound selected from the group consisting of iron salts of carboxylic acids containing from 2 to 40 carbon atoms and iron complexes of 1,3-diketones, (2) trialkyl aluminums, lithium tetraethyl aluminate and diethyl aluminum ethoxide, and (3) a bidentate nitrogen compound selected from the group consisting of glyoxal-bis-(2,6- dimethylanil), biacetyl-bis-(2,6-dimethylanil), glyoxal-bis-(4-methylanil), biacetyl-bis-(4-methylanil), glyoxal-bis-(2-methylanil), biacetyl-bis-(4-methylanil), glyoxal-bis-(2-methylanil), biacetyl-bis-(2-methylanil), glyoxal-bis-anil, biacetyl-bisanil, glyoxal-bis-(4-ethoxyanil), biacetyl-bis-(4-ethoxyanil), glyoxal-bis-(3-methoxyanil), biacetyl-bis-(3-methoxyanil), glyoxal-bis-(3-methoxyanil), biacetyl-bis-(3-methoxyanil), glyoxal-bis-(4-dimethylaminoanil), biacetyl-bis-(4-dimethylaminoanil), glyoxal-bis-(2,6-dimethyl-4-ethoxyanil), biacetyl-bis-(2,6-dimethyl-4-ethoxyanil), 2-pyridine carboxaldehydeanil, 2-pyridine carboxaldehyde-2-methylanil, 2-pyridinecarboxaldehyde-4-methylanil, 2-pyridinecarboxaldehyde-2-isopropylanil, 2-pyridinecarboxaldehyde-2-ethylanil, 2-pyridinecarboxaldehyde-4-methoxyanil, 2-pyridinecarboxaldehyde-4-dimethylaminoanil, 2-pyridinecarboxaldehyde-2,6-dimethyl-4-methoxyanil, 2-pyridinecarboxaldehyde-2,6-dimethyl-4-dimethylaminoanil, 2-acetylpyridine-2-methylanil, 2-acetylpyridine-4-methylanil, 2-acetylpyridine-2-isopropylanil, 2-acetylpyridine-4-methoxyanil and 2-acetylpyridine-4-dimethylaminoanil.

2. A process according to claim 1 wherein the lower α-olefin is ethylene and has a pressure of from 200 to 1000 psig; the mole ratio of the iron compound/conjugated diolefin is 1/1000 to 1/10$^4$; the mole ratio of the bidentate nitrogen compound/iron compound is from 1/1 to 3/1; the mole ratio of the organoaluminum compound/iron compound is from 4/1 to 9/1 and the organoaluminum compound is a trialkyl aluminum.

3. A method according to claim 1 wherein the lower α-olefin hydrocarbon is selected from the group consisting of ethylene, propylene and 1-butene.

4. A method according to claim 1 in which 1,3-butadiene and ethylene are codimerized wherein the catalyst consists of glyoxal-bis-(2,6-dimethylanil), iron octanoate and triethyl aluminum.

5. A method according to claim 1 in which 2,3-dimethyl-1,3-butadiene and ethylene are codimerized wherein the catalyst consists of glyoxal-bisanil, iron octanoate and triethyl aluminum.

6. A method according to claim 1 in which 1,3-butadiene and ethylene are codimerized wherein the catalyst consists of biacetyl-bis-(2,6-dimethylanil), iron octanoate and triethyl aluminum.

7. A method according to claim 1 in which 2,3-dimethyl-1,3-butadiene and ethylene are codimerized wherein the catalyst consists of biacetyl-bis-(2,6-dimethylanil), iron octanoate and triethyl aluminum.

8. A method according to claim 1 in which 2,3-dimethyl-1,3-butadiene and ethylene are codimerized wherein the catalyst consists of biacetyl-bis-(4-ethoxyanil), iron octanoate and triethyl aluminum.

* * * * *

UNITED STATES PATENT OFFICE
CERTIFICATE OF CORRECTION

PATENT NO. : 3,927,137
DATED : December 16, 1975
INVENTOR(S) : Jay G. Bryson

It is certified that error appears in the above–identified patent and that said Letters Patent are hereby corrected as shown below:

Column 3, line 44, "10/1" should read -- 1/10 --.

Signed and Sealed this

Twelfth Day of October 1976

[SEAL]

Attest:

RUTH C. MASON
Attesting Officer

C. MARSHALL DANN
Commissioner of Patents and Trademarks